(12) United States Patent
Nandagopalan et al.

(10) Patent No.: US 8,577,416 B2
(45) Date of Patent: *Nov. 5, 2013

(54) TRANSCEIVER WITH PLURAL SPACE HOPPING ARRAY ANTENNAS AND METHODS FOR USE THEREWITH

(71) Applicants: Saishankar Nandagopalan, San Diego, CA (US); Jeyhan Karaoguz, Irvine, CA (US); Jason A. Trachewsky, Menlo Park, CA (US); Vinko Erceg, Cardiff by the Sea, CA (US); Christopher J. Hansen, Los Altos, CA (US); Matthew James Fischer, Mountain View, CA (US); Murat Mese, Rancho Palos Verdes, CA (US)

(72) Inventors: Saishankar Nandagopalan, San Diego, CA (US); Jeyhan Karaoguz, Irvine, CA (US); Jason A. Trachewsky, Menlo Park, CA (US); Vinko Erceg, Cardiff by the Sea, CA (US); Christopher J. Hansen, Los Altos, CA (US); Matthew James Fischer, Mountain View, CA (US); Murat Mese, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,177

(22) Filed: Jan. 25, 2013

(65) Prior Publication Data

US 2013/0137385 A1 May 30, 2013

Related U.S. Application Data

(63) Continuation of application No. 13/437,349, filed on Apr. 2, 2012, now Pat. No. 8,385,844, which is a continuation of application No. 12/428,185, filed on Apr. 22, 2009, now Pat. No. 8,175,542.

(51) Int. Cl.
*H04B 1/44* (2006.01)
*H01Q 3/00* (2006.01)

(52) U.S. Cl.
USPC .......................................... 455/562.1; 455/77

(58) Field of Classification Search
None
See application file for complete search history.

(56) References Cited

U.S. PATENT DOCUMENTS

| | | | |
|---|---|---|---|
| 7,072,692 B1 * | 7/2006 | Katz et al. .................. | 455/562.1 |
| 8,170,495 B2 * | 5/2012 | Trachewsky et al. ........... | 455/73 |
| 8,170,496 B2 * | 5/2012 | Nandagopalan et al. ....... | 455/73 |
| 2009/0005121 A1 * | 1/2009 | Wong et al. ................ | 455/562.1 |

* cited by examiner

*Primary Examiner* — Lincoln Donovan
*Assistant Examiner* — Terry L Englund
(74) *Attorney, Agent, or Firm* — Garlick & Markison; Bruce E. Stuckman

(57) ABSTRACT

A wireless transceiver includes an antenna array that transmits an outbound RF signal containing outbound data to remote transceivers and that receives an inbound RF signal containing inbound data from the remote RF transceivers, wherein the antenna array is configurable based on a control signal. An antenna configuration controller generates the control signal to configure the antenna array to hop among a plurality of radiation patterns based on a hopping sequence. An RF transceiver section generates the outbound RF signal based on the outbound data and that generates the inbound data based on the inbound RF signal. In one configuration, a switching section selectively couples a selected one of the antennas in the array to the RF transceiver section, based on the control signal. In another configuration, the RF transceiver section includes an RF section for each antenna in the array.

20 Claims, 13 Drawing Sheets

Hopping sequence 70: Antenna configuration 1 | Antenna configuration 2 | Antenna configuration 3 | ... | Antenna configuration N Hopping sequence 72: Antenna configuration 3 | Antenna configuration 6 | Antenna configuration 2 | ... | Antenna configuration 1

| Radiation pattern | Selected? | Control Signal |
|---|---|---|
| 001 | no | CS001 |
| 002 | no | CS002 |
| 003 | yes | CS003 |
| 004 | no | CS004 |

Data table 90

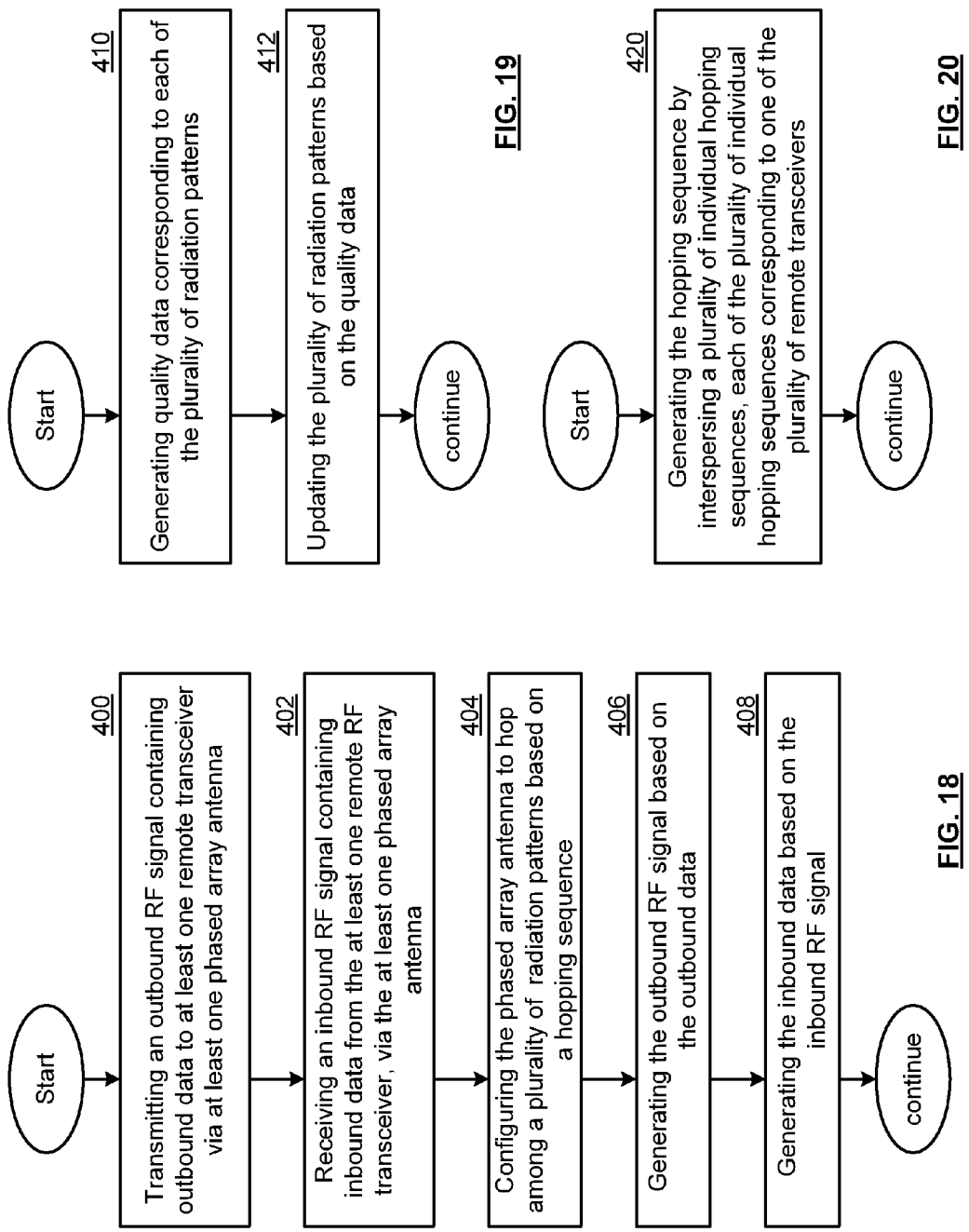

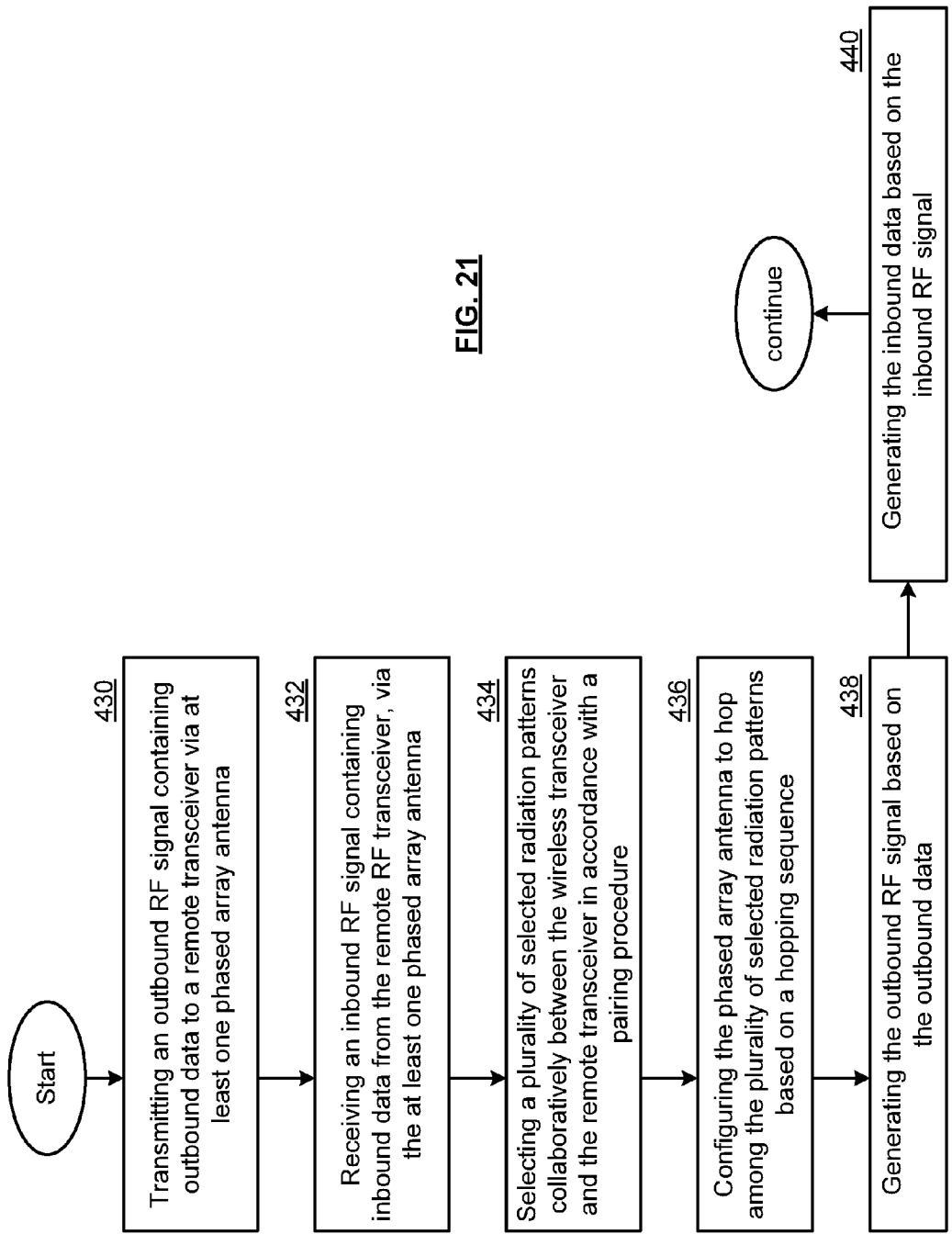

TRANSCEIVER WITH PLURAL SPACE HOPPING ARRAY ANTENNAS AND METHODS FOR USE THEREWITH

CROSS REFERENCE TO RELATED PATENTS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:
1. U.S. Utility application Ser. No. 13/437,349, entitled "TRANSCEIVER WITH PLURAL SPACE HOPPING PHASED ARRAY ANTENNAS AND METHODS FOR USE THEREWITH," filed Apr. 2, 2012, now U.S. Pat. No. 8,385,844 issued on Feb. 26, 2013, which claims priority pursuant to 35 U.S.C. §120, as a continuation, to the following U.S. Utility Patent Application which is hereby incorporated herein by reference in its entirety and made part of the present U.S. Utility patent Application for all purposes:
    a. U.S. Utility patent application Ser. No. 12/428,185, entitled TRANSCEIVER WITH PLURAL SPACE HOPPING PHASED ARRAY ANTENNAS AND METHODS FOR USE THEREWITH, filed on Apr. 22, 2009 and issued as U.S. Pat. No. 8,175,542.

The present application is related to the following U.S. patent applications:
U.S. Utility patent application Ser. No. 12/428,169, entitled TRANSCEIVER WITH SPACE HOPPING PHASED ARRAY ANTENNA AND METHODS FOR USE THEREWITH, filed on Apr. 22, 2009 and issued as U.S. Pat. No. 8,170,496; and
U.S. Utility patent application Ser. No. 12/428,156, entitled COLLABORATIVE PAIRING TRANSCEIVER WITH SPACE HOPPING PHASED ARRAY ANTENNA AND METHODS FOR USE THEREWITH, filed on Apr. 22, 2009 and issued as U.S. Pat. No. 8,170,495;
the contents of which are incorporated herein by reference thereto.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication and more particularly to antennas used to support wireless communications.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Currently, wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain. Another unlicensed frequency spectrum is the V-band of 55-64 GHz.

Different radio networks sometimes share the same spectrum. For example, Bluetooth transceivers and 802.11 g transceivers may both be present in a single area using the 2.4 GHz band. In the V-band, devices using Wireless HD (WiHD) and devices using the Next Generation Microwave System (NGMS) may be present in a single area. Transmissions by one device can cause interference with other devices that use the same frequency band with the same area.

Other disadvantages of conventional approaches will be evident to one skilled in the art when presented the disclosure that follows.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 18 is a flowchart representation of an embodiment of a method in accordance with the present invention;

FIG. 19 is a flowchart representation of an embodiment of a method in accordance with the present invention;

FIG. 20 is a flowchart representation of an embodiment of a method in accordance with the present invention; and FIG. 21 is a flowchart representation of an embodiment of a method in accordance with the present invention.

DETAILED DESCRIPTION OF THE INVENTION

Figure 1:
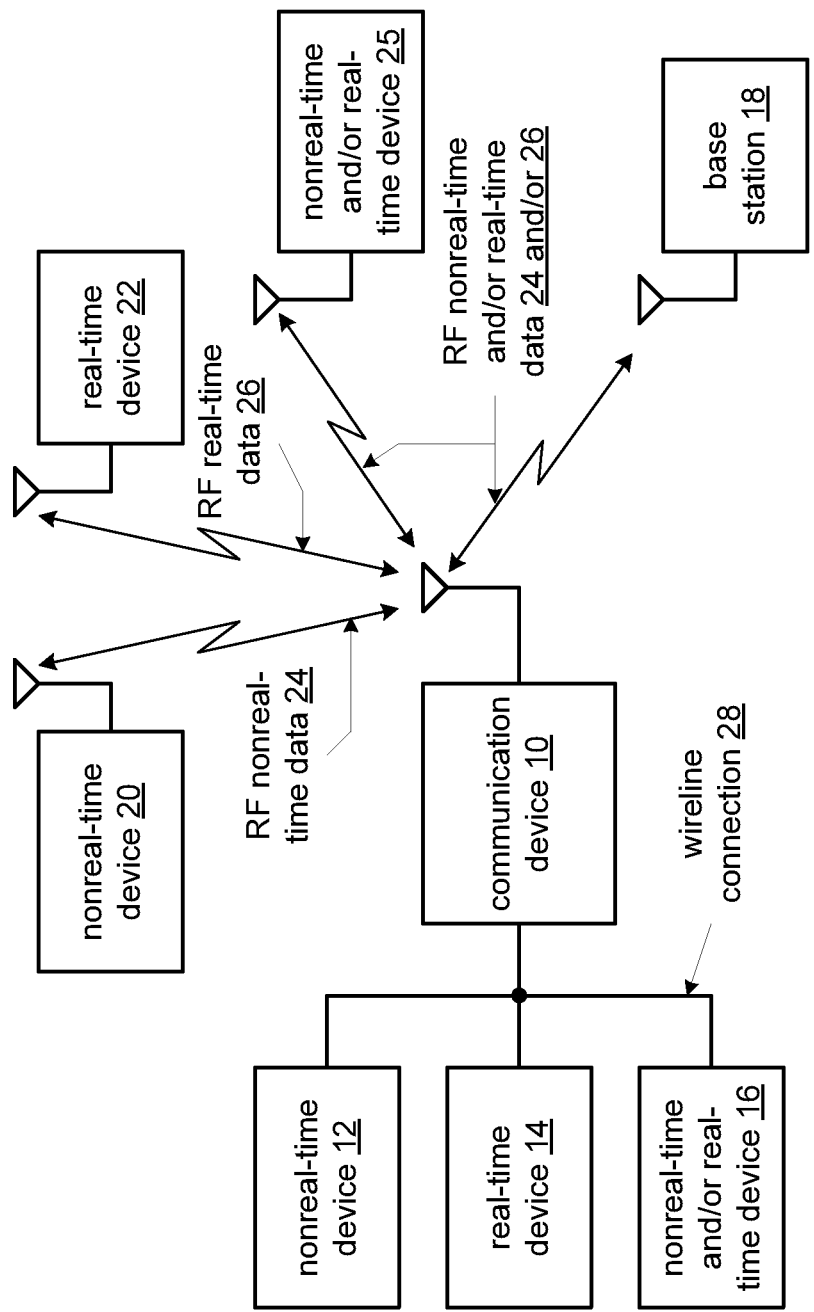
FIG. 1 is a schematic block diagram of an embodiment of a wireless communication system in accordance with the present invention.

FIG. 1 is a schematic block diagram of an embodiment of a communication system in accordance with the present invention. In particular a communication system is shown that includes a communication device 10 that communicates non-real-time data 24 and/or real-time data 26 wirelessly with one or more other devices such as base station 18, non-real-time device 20, real-time device 22, and non-real-time and/or real-time device 25. In addition, communication device 10 can also optionally communicate over a wireline connection with non-real-time device 12, real-time device 14, non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, NGMS, IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/ video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes a wireless transceiver that includes one or more features or functions of the present invention. Such wireless transceivers shall be described in greater detail in association with FIGS. 3-21 that follow.

Figure 2:
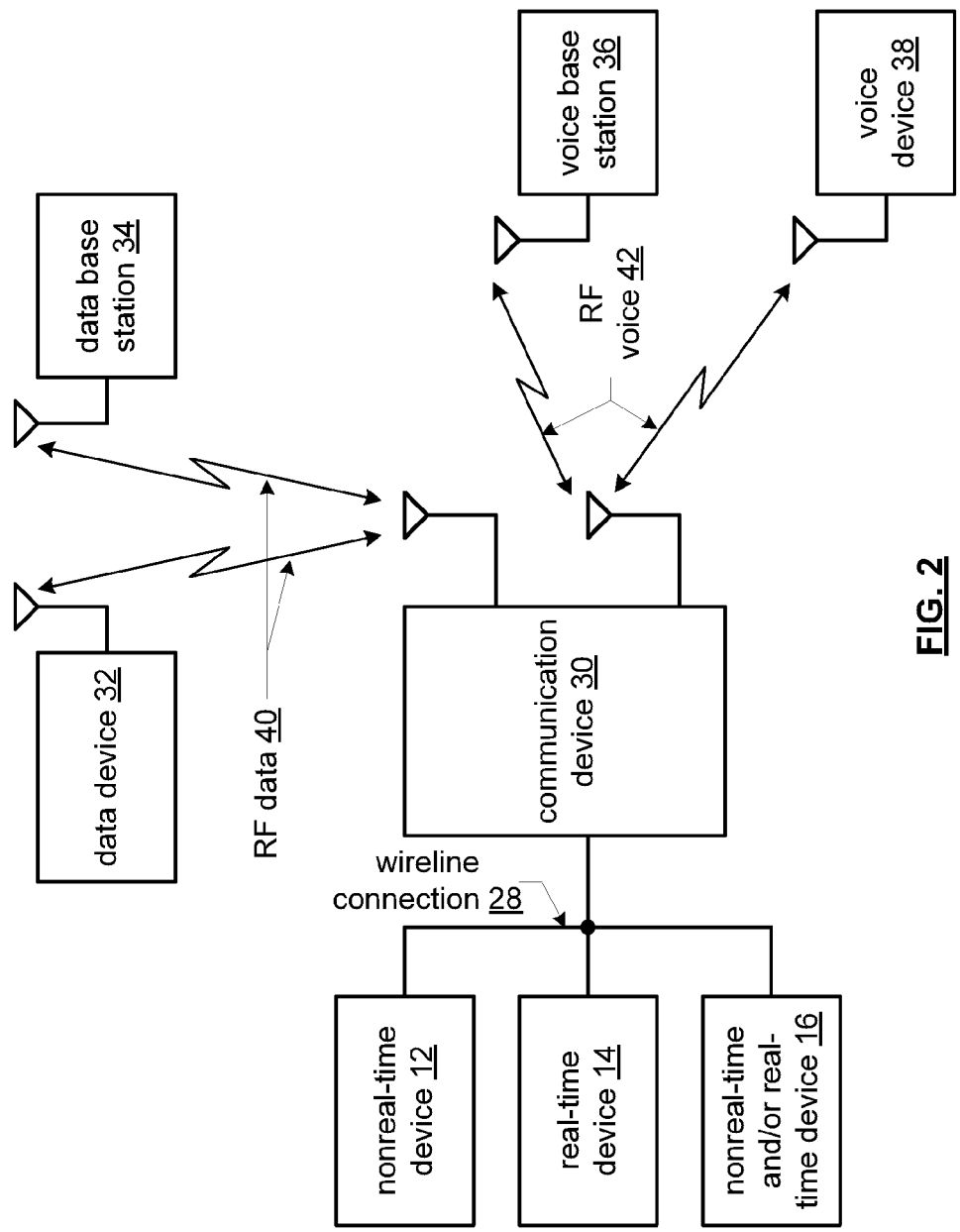
FIG. 2 is a schematic block diagram of another embodiment of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
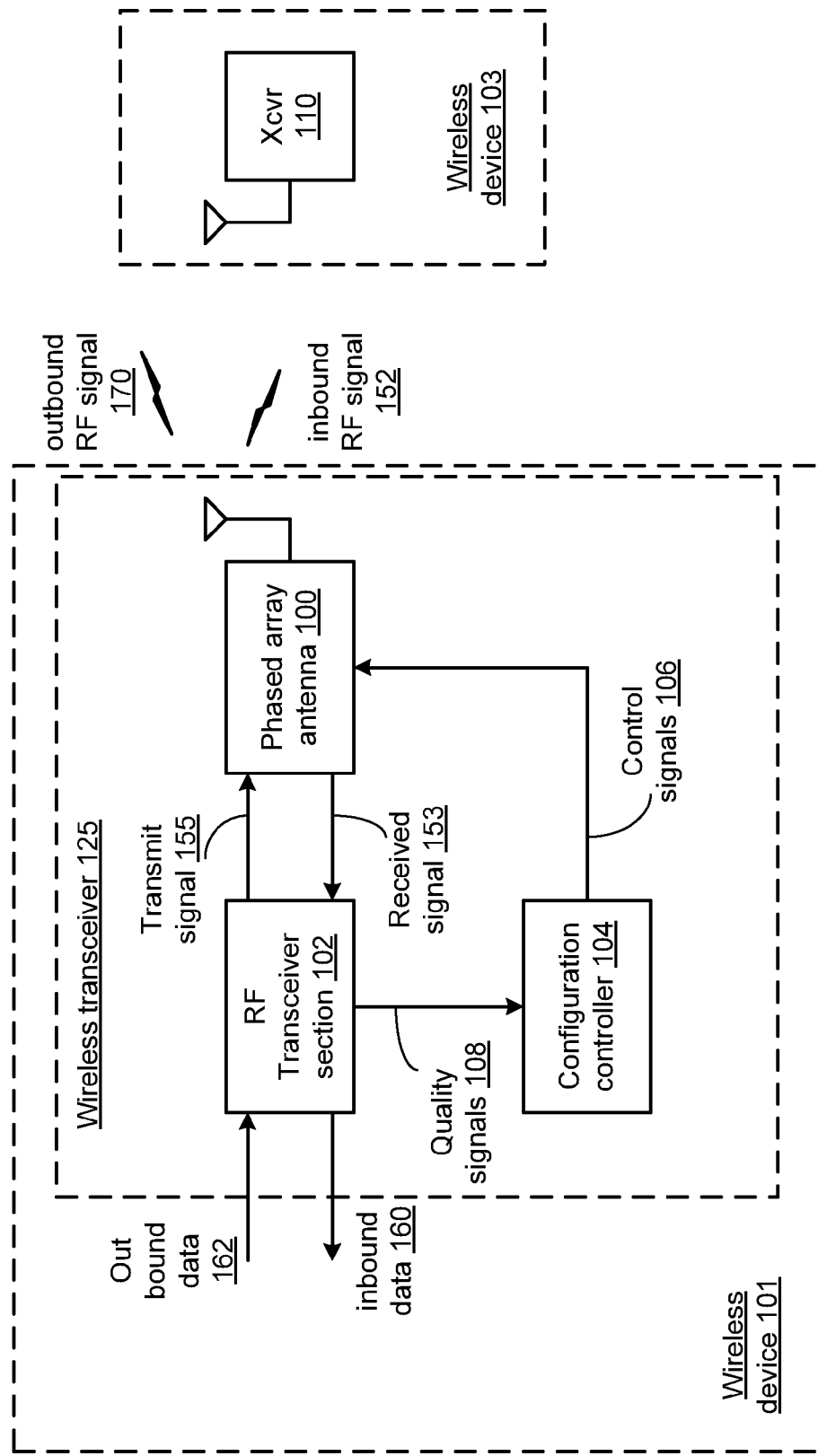
FIG. 3 is a schematic block diagram of an embodiment of a wireless transceiver 125 in accordance with the present invention.

FIG. 3 is a schematic block diagram of an embodiment of a wireless transceiver 125 in accordance with the present invention. In particular, a wireless transceiver 125 is shown that is included in a wireless device 101, such as communication device 10 or 30 or other wireless device. Wireless transceiver includes phased array antenna 100 that transmits an outbound RF signal 170 containing outbound data 162 to one or more remote transceivers such as wireless device 103 having a complementary transceiver 110. In addition, phased array antenna 100 receives an inbound RF signal 152 containing inbound data 160 from the wireless device 103. The phased array antenna 100 is configurable based on control signals 106 to a plurality of different radiation patterns.

In an embodiment of the present invention, the phased array antenna 100 includes multiple individual antenna elements. Examples of such individual antenna elements include monopole or dipole antennas, three-dimensional in-air helix antenna, aperture antennas of a rectangular shape, horn shaped, etc.; dipole antennas having a conical shape, a cylinder shape, an elliptical shape, etc.; and reflector antennas having a plane reflector, a corner reflector, or a parabolic reflector; meandering pattern or a micro strip configuration. In addition, phased array antenna 100 includes a control matrix that controls the phase and amplitude of the signals to and from each individual antenna element in order to adjust the radiation pattern of the array based on an antenna weight vector. The phased array antenna 100 can be tuned for operation in the V-band of 55-64 GHz or other millimeter wave frequency band or other portion of the RF spectrum such as a 900 MHz band, 2.4 GHz band or 5 GHz band.

The antenna configuration controller 104 generates the control signals 106 to configure the phased array antenna 100 to hop among the plurality of radiation patterns based on a hopping sequence. The RF transceiver section 102 generates a transmit signal 155 based on the outbound data 162 that is transmitted as outbound RF signal 170. In addition, the RF transceiver section 102 generates the inbound data 160 from a received signal 153 generated by phased array antenna 100 in response to the inbound RF signal 152. The phased array antenna 100 can include a single array, separate arrays of antennas for transmission and reception and/or separate arrays that are physically separated.

Configuration controller 104 can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the configuration controller 104 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, the configuration controller 104 contains a table of control signals 106 that correspond to a plurality of candidate radiation patterns. In operation, a particular radiation pattern is generated for the phased array antenna 100 by the configuration controller 104 generating the corresponding control signals 106, and the phased array antenna 100 adjusting gain and phase parameters for each antenna in the array in response thereto. In an embodiment of the present invention, the control signals 106 include a particular value of the antenna weight vector that is used by the phased array antenna 100 the adjust the antenna configuration to the desired radiation pattern. Alternatively, the control signals 106 can include any other signal that indicates the desired radiation pattern.

As will be discussed further in conjunction with FIGS. 10-12, configuration controller 104 can select a plurality of selected radiation patterns based on quality signals 108 from RF transceiver section 102. In particular, quality signals 108, such as a signal strength, a signal to noise ratio, a signal to noise and interference ratio, a bit error rate, a packet error rate and a retransmission rate, can be generated based on the transmission or reception characteristics between the wireless transceiver 125 and one or more remote transceivers such as transceiver 110. Configuration controller 104 generates quality data corresponding to a particular radiation pattern that indicates how well this particular radiation pattern will perform in communicating with a corresponding transceiver 110. Candidate radiation patterns can be selected or eliminated by comparing the quality data to a quality threshold. In this fashion, radiation patterns for phased array antenna 100 that correspond to good communication paths can be identified and selected to be included in the hopping sequence.

Further, the configuration controller 104 can update the radiation patterns included in the hopping sequence by continually monitoring the quality data. In particular, the configuration controller 104 can generate aggregate quality data corresponding to multiple occurrences of each of the of radiation patterns. When each radiation pattern occurs in the hopping sequence, the aggregate quality data for that particular radiation pattern can be updated based on a windowing approach, an exponentially weighted moving average, a low pass filter or other smoothing technique. If the aggregate quality data falls below the quality threshold for a particular radiation pattern, the configuration controller 104 can update the radiation patterns used in the hopping sequence by removing that radiation pattern. In this fashion, the selection of radiation patterns can be tolerant of temporary quality lapses caused by transient conditions, however, consistently underperforming radiation patterns can be removed.

Figure 4:
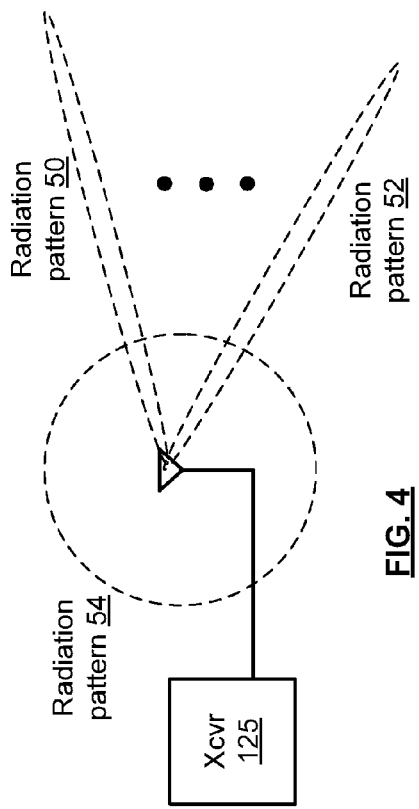
FIG. 4 is a schematic block diagram of various radiation patterns produced by wireless transceiver 125 in accordance an embodiment of the present invention.

FIG. 4 is a schematic block diagram of various radiation patterns produced by wireless transceiver 125 in accordance an embodiment of the present invention. In this example, the phased array antenna 100 can include 30-40 individual antenna elements and can produce steerable beam having a beamwidth of 1 to 3 degrees, as well as other beam patterns including an omnidirectional radiation pattern. Radiation patterns 50 and 52 present examples of two such narrow beam radiation patterns, while radiation pattern 54 represents a substantially omnidirectional pattern. While these radiation patterns are presented in two dimensions, it should be recognized that the radiation patterns 50 and 52 are representative of possible radiation patterns in any direction in three dimensional space. Radiation pattern 54 can be a three-dimensional omnidirectional pattern or a pattern that is omnidirectional or substantially omnidirectional about one or more axes.

Figure 5:
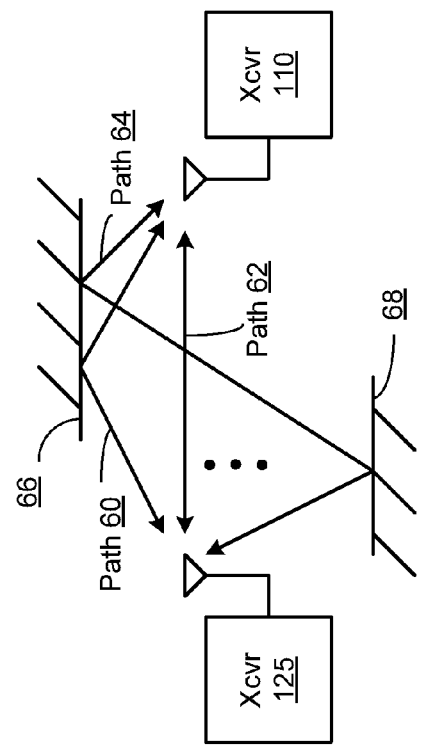
FIG. 5 is a schematic block diagram of various communication paths produced by wireless transceiver 125 in accordance an embodiment of the present invention.

FIG. 5 is a schematic block diagram of various communication paths produced by wireless transceiver 125 in accordance an embodiment of the present invention. In particular, paths 60, 62 and 64 represent three communication paths produced by the phased array antenna 100 hopping among the plurality of radiation patterns. In this particular case, transceiver 110 is implemented in a similar fashion to transceiver 125 and also includes a phased array antenna, such as phased array antenna 100. As transceiver 125 changes antenna configurations to implement a different radiation pattern for its next hop, transceiver 110 changes antenna configurations to implement a complementary radiation pattern to create a communication path between the two transceivers.

For example, in a first hop in the hop sequence, transceivers 125 and 110 steer their antenna beams to produce communication path 60 that includes a reflection off of object 66, such as a ceiling, wall, floor, article of furniture or other object. In a second hop in the hop sequence, transceivers 125 and 110 steer their antenna beams to produce a line of sight path 62. In a third hop in the hop sequence, transceivers 125 and 110 steer their antenna beams to produce communication path 64 that includes a reflection off of objects 66 and 68.

While these communications paths are presented in two dimensions, it should be recognized that the paths 60, 62 and 64 are representative of possible communication paths in any direction in three dimensional space.

Figures 6, 7, 8:
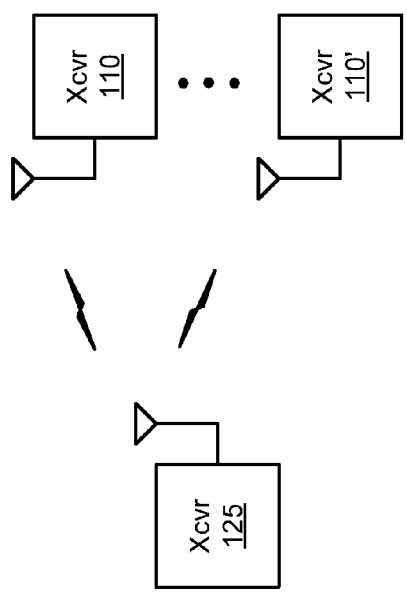
FIG. 6 is a schematic block diagram of a hopping sequence in accordance an embodiment of the present invention.
FIG. 7 is a schematic block diagram of a hopping sequence in accordance another embodiment of the present invention.
FIG. 8 is a schematic block diagram of another embodiment of a wireless communication system in accordance with the present invention.

FIG. 6 is a schematic block diagram of a hopping sequence in accordance an embodiment of the present invention. In particular, a hopping sequence 70 is shown for a phased array antenna such as phased array antenna 100. In this example, the hopping sequence includes N antenna configuration corresponding to N different communication paths. The order of these paths is shared between the transceivers 110 and 125 such that the radiation patterns of the phased array antennas are aligned to either end of each corresponding communication path so that hopping in a sequence of antenna configurations results in corresponding radiation patterns that implement a sequence of different communication paths between the transceivers as discussed in conjunction with FIG. 5. In particular, the timing and ordering of the hopping sequence can be coordinated between configuration controllers 104 of the transceivers 110 and 125 via control signaling to synchronize the change to each successive next antenna configuration and each corresponding next communication path. As shown, the hopping sequence cycles through each of the antenna configurations in a particular order. This sequence repeats itself, however, if a particular antenna configuration is rejected due to low quality as discussed in conjunction with FIG. 3, it can be removed from the sequence.

The transmission of data between transceivers 110 and 125, over time, is spread over each of the N communication paths. The use of acknowledgement protocols, retransmission or other error correction techniques in conjunction with the spatial reuse provided by the hopping sequence allows communications between transceivers 110 and 125 to more reliable in the presence of interference, path obstructions, etc.

FIG. 7 is a schematic block diagram of a hopping sequence in accordance another embodiment of the present invention. While FIG. 6 presented a cyclic hopping sequence other hopping sequences are likewise possible. In the example shown in hopping sequence 72, a pseudorandom hopping sequence is used. As discussed in conjunction with FIG. 6, the timing and ordering of the hopping sequence can be coordinated between the transceivers 110 and 125 via control signaling to synchronize the change to each successive next antenna configuration and each corresponding next communication path. In this embodiment, a seed used to generate the pseudorandom sequence can be shared between the configuration controllers 104 of transceivers 110 and 125 to facilitate the synchronization of hopping sequence implemented by these devices.

FIG. 8 is a schematic block diagram of another embodiment of a wireless communication system in accordance with the present invention. In this embodiment, a single transceiver 125 can communicate with two or more remote transceivers 110 and 110' via space hopping. In this embodiment, the hopping sequence employed by transceiver 125 includes a plurality of individual hopping sequences each corresponding to one of the plurality of remote transceivers 110. In this fashion, transceiver 125 can carry on communications in accordance with the present invention contemporaneously with two or more devices.

Figure 9:
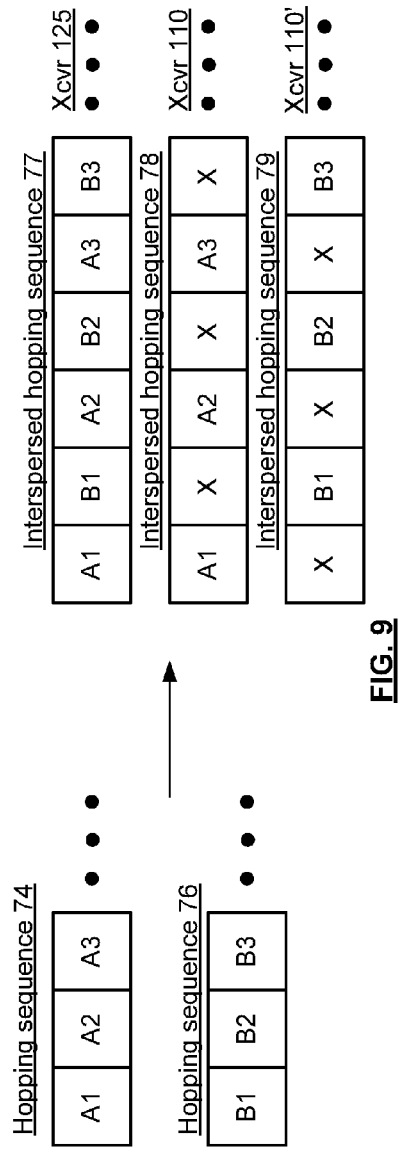
FIG. 9 is a schematic block diagram of an interspersed hopping sequence in accordance an embodiment of the present invention.

FIG. 9 is a schematic block diagram of an interspersed hopping sequence in accordance an embodiment of the present invention. In this example, transceiver 125 communicates with two remote transceivers 110 and 110'. A hopping sequence 74 is established for communications between transceiver 125 and transceiver 110 with A1, A2, A3, . . . representing different antenna configurations corresponding to radiation patterns that implement communication paths between these two devices. Further, hopping sequence 76 is established for communications between transceiver 125 and transceiver 110' with B1, B2, B3, . . . representing different antenna configurations corresponding to radiation patterns that implement communication paths between this device pair.

Transceiver 125 implements an interspersed hopping sequence 77 that alternates hops between antenna configurations A1, A2, A3 . . . that implement communication paths with transceiver 110 and antenna configurations B1, B2, B3 . . . that implement communication paths with transceiver 110'. As shown, transceivers 110 and 110' implement complementary hopping sequences 78 and 79 with "x" representing a non-use period for that device. While the example shown intersperses the two hopping sequences 74 and 76 via simple interleaving, other interspersals are likewise possible, particularly if the data rates between devices are different.

Figure 10:
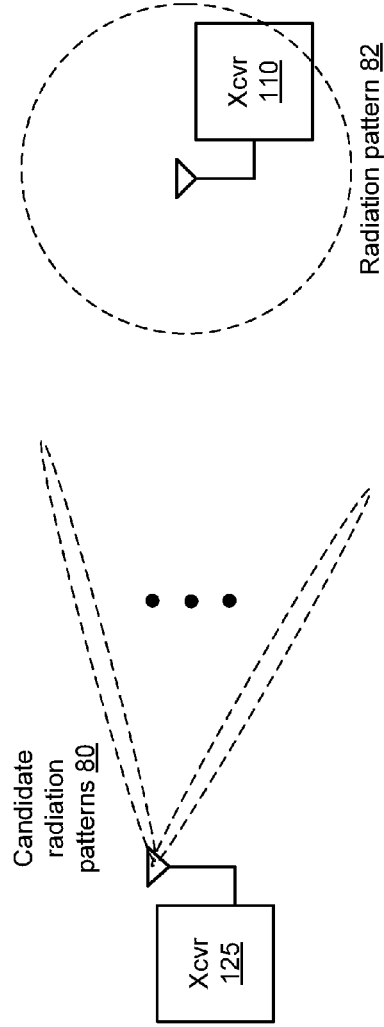
FIG. 10 is a schematic block diagram of a wireless transceiver 125 and wireless transceiver 110 during a pairing procedure in accordance an embodiment of the present invention.

FIG. 10 is a schematic block diagram of a wireless transceiver 125 and wireless transceiver 110 during a pairing procedure in accordance an embodiment of the present invention. In order to initialize the spatial hopping sequence used between two wireless transceivers, such as wireless transceivers 110 and 125, the particular set of radiation patterns to be used by each device and the association between each of the radiation patterns needs to be determined. In particular, a collaborative pairing procedure is employed to determine selected radiation patterns for each device in such a fashion that a radiation pattern for one device is associated with a reciprocal radiation pattern for the other device. Coordination of the various activities of the pairing procedure between the configuration controllers 104 of the two devices communicating via control signaling effectuated via omnidirectional antenna configurations for one or both devices.

The pairing procedure includes a procedure that configures the radiation patterns for the wireless transceiver 125. In this portion of the pairing procedure, the configuration controller 104 of transceiver 110 generates controls signals 106 to establish an omnidirectional or substantially omnidirectional radiation pattern 82. The configuration controller 104 of wireless transceiver 125 generates control signals 106 to iteratively test each of a plurality of candidate radiation patterns 80. The configuration controller 104 generates quality data based on quality signals 108 for each of the candidate radiation patterns 80 and selects candidate radiation patterns for use in the hopping sequence when the quality data for that candidate radiation pattern compares favorably to a quality threshold. In summary, the configuration controller 104 selects candidate radiation patterns for inclusion in the hopping sequence when their transmission/reception characteristics indicate that an acceptable communication path to transceiver 110 exists along the axis of that candidate radiation pattern.

Other, more advanced criteria can also be used in the selection of radiation patterns for inclusion in the hopping sequence. For example, the quality threshold process described above can be used to select a group of radiation patterns that is further narrowed based on other criteria. For instance, a hopping sequence of fixed size N may be desired and the configuration control 104 could select the best N radiation patterns from the group selected based on the quality threshold. In another example, the M radiation patterns with the lowest transmit power can be selected based on the quality threshold. In a further example, radiation patterns with a transmit power higher than a desired transmit power threshold can be eliminated. Other criteria can likewise be employed by configuration controller 104 to further arrive upon a final set of radiation patterns for transceiver 125.

While the candidate radiation patterns 80 are presented in two dimensions, it should be recognized that the candidate radiation patterns 80 are representative of possible radiation patterns in any direction in three dimensional space.

Figures 11, 12:
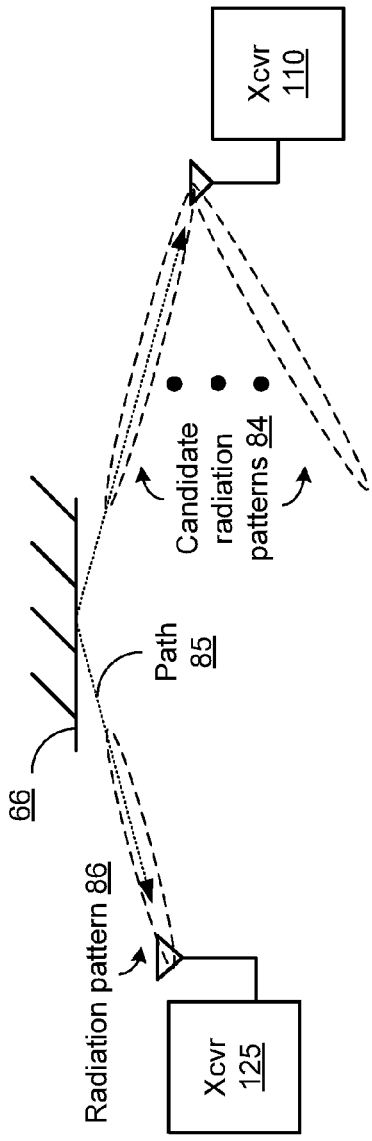
FIG. 11 is a further schematic block diagram of a wireless transceiver 125 and wireless transceiver 110 during a pairing procedure in accordance an embodiment of the present invention.
FIG. 12 is a schematic block diagram of an embodiment of a data table in accordance with the present invention.

FIG. 11 is a further schematic block diagram of a wireless transceiver 125 and wireless transceiver 110 during a pairing procedure in accordance an embodiment of the present invention. After transceiver 125 has selected a set of radiation patterns to be included in the hopping sequence, the pairing procedure continues by determining a set of reciprocal radiation patterns for wireless transceiver 110. In this portion of the pairing procedure, the configuration controller 104 of transceiver 125 generates controls signals 106 to select a first one of the selected radiation patterns 86 corresponding to path 85. The configuration controller 104 of wireless transceiver 110 generates control signals 106 to iteratively test each of a plurality of candidate radiation patterns 84. The configuration controller 104 generates quality data based on quality signals 108 for each of the candidate radiation patterns 84 and selects a reciprocal radiation pattern for use in conjunction with radiation pattern 86 as the candidate radiation pattern that generates the most favorable value of the quality data. Once the first reciprocal radiation patterns is determined, the process is repeated by continuing to cycle through each of the other radiation patterns selected by transceiver 125 so that reciprocal radiation patterns for wireless transceiver 110 can be determined in a similar fashion.

While the candidate radiation patterns 84 and radiation pattern 86 and path 85 are presented in two dimensions, it should be recognized that the candidate radiation patterns 84, radiation pattern 86 and path 85 are representative of possible radiation patterns and paths in any direction in three dimensional space.

It should also be noted that while various functions in the pairing procedure performed by wireless transceiver 125 and 110 can be reversed in other embodiments.

FIG. 12 is a schematic block diagram of an embodiment of a data table in accordance with the present invention. In particular a data table 90 is shown for use in conjunction with a configuration controller, such as configuration controller 104. In particular, control signal data CS001, CS002, CS003, CS004 are stored in association with corresponding radiation patterns 001, 002, 003, 004, etc. The data table 90 can store data corresponding to all possible radiation patterns such as all possible candidate radiation patterns. To implement a particular radiation pattern, such as pattern 002, the configuration controller can lookup the corresponding control signal data, in this case CS002, to generate the control signals 106. As shown, the data table 90 includes an indicator of whether a particular candidate radiation pattern has been selected for inclusion in the hopping sequence or not. During the pairing procedure, the configuration controller can cycle through each of the radiation patterns in the data table 90 to select the set of radiation patterns to include in the hopping sequence and/or to identify the reciprocal set of radiation patterns corresponding to radiation patterns of remote transceivers.

Figures 13, 14:
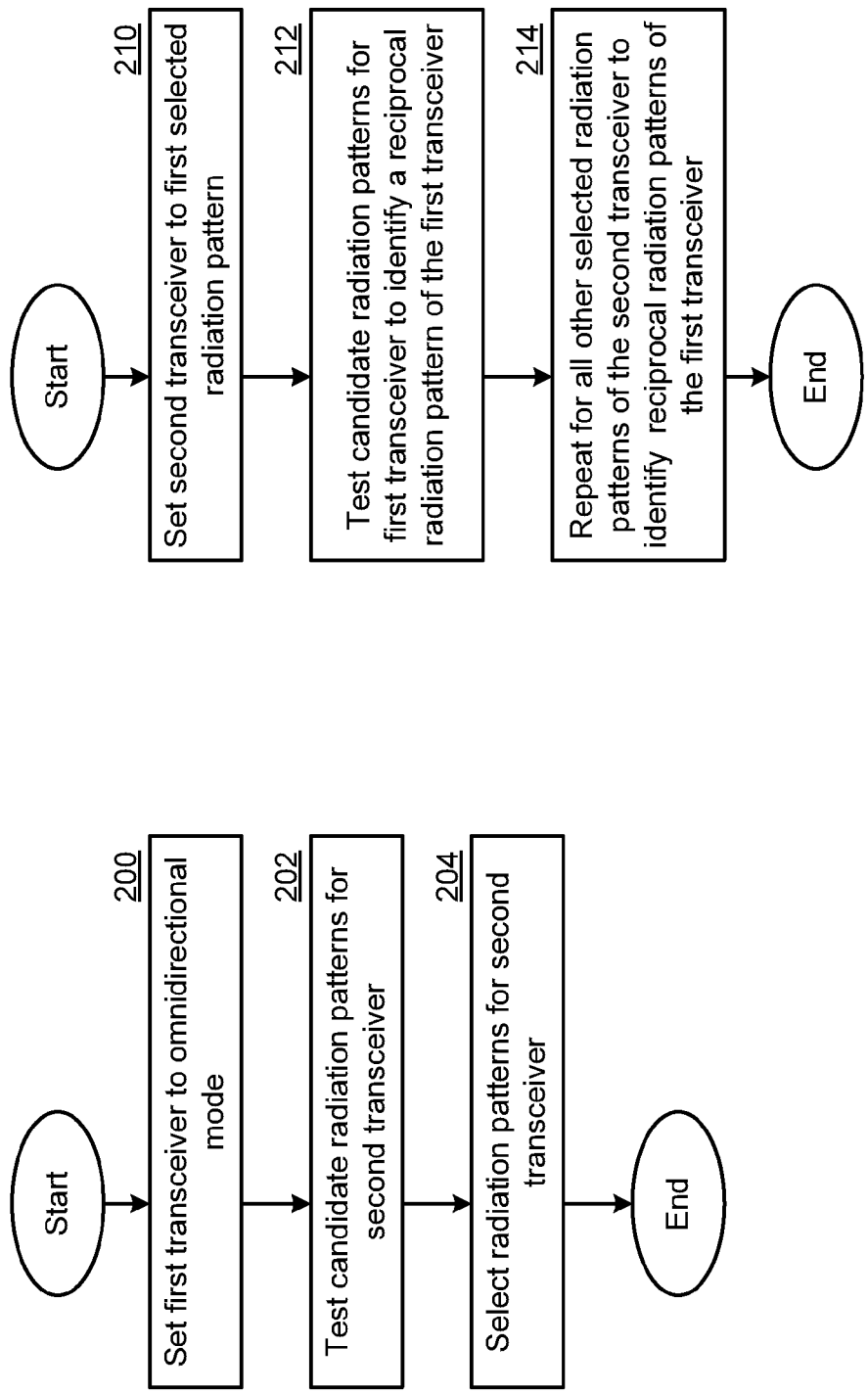
FIG. 13 is a flowchart representation of an embodiment of a method in accordance with the present invention.
FIG. 14 is a flowchart representation of an embodiment of a method in accordance with the present invention.

FIG. 13 is a flowchart representation of an embodiment of a method in accordance with the present invention. In particular, a portion of a collaborative pairing procedure between a first and second transceiver is shown. In step 200, a first transceiver is set to an omnidirectional mode. In step 202, candidate radiation patterns are tested for the second transceiver. In step 204, radiation patterns are selected for the second transceiver, based on the test results.

FIG. 14 is a flowchart representation of an embodiment of a method in accordance with the present invention. In particular a method is presented for use in association with the method presented in conjunction with FIG. 13. In particular, after the method of FIG. 13 is performed, the second transceiver is set to a first selected radiation pattern, as shown in step 210. In step 212, the candidate radiation patterns for the first transceiver are tested to identify a reciprocal radiation pattern for the first transceiver. In step 214, the process is repeated for all other selected radiation patterns of the second transceiver to identify corresponding reciprocal radiation patterns of the first transceiver.

Figure 15:
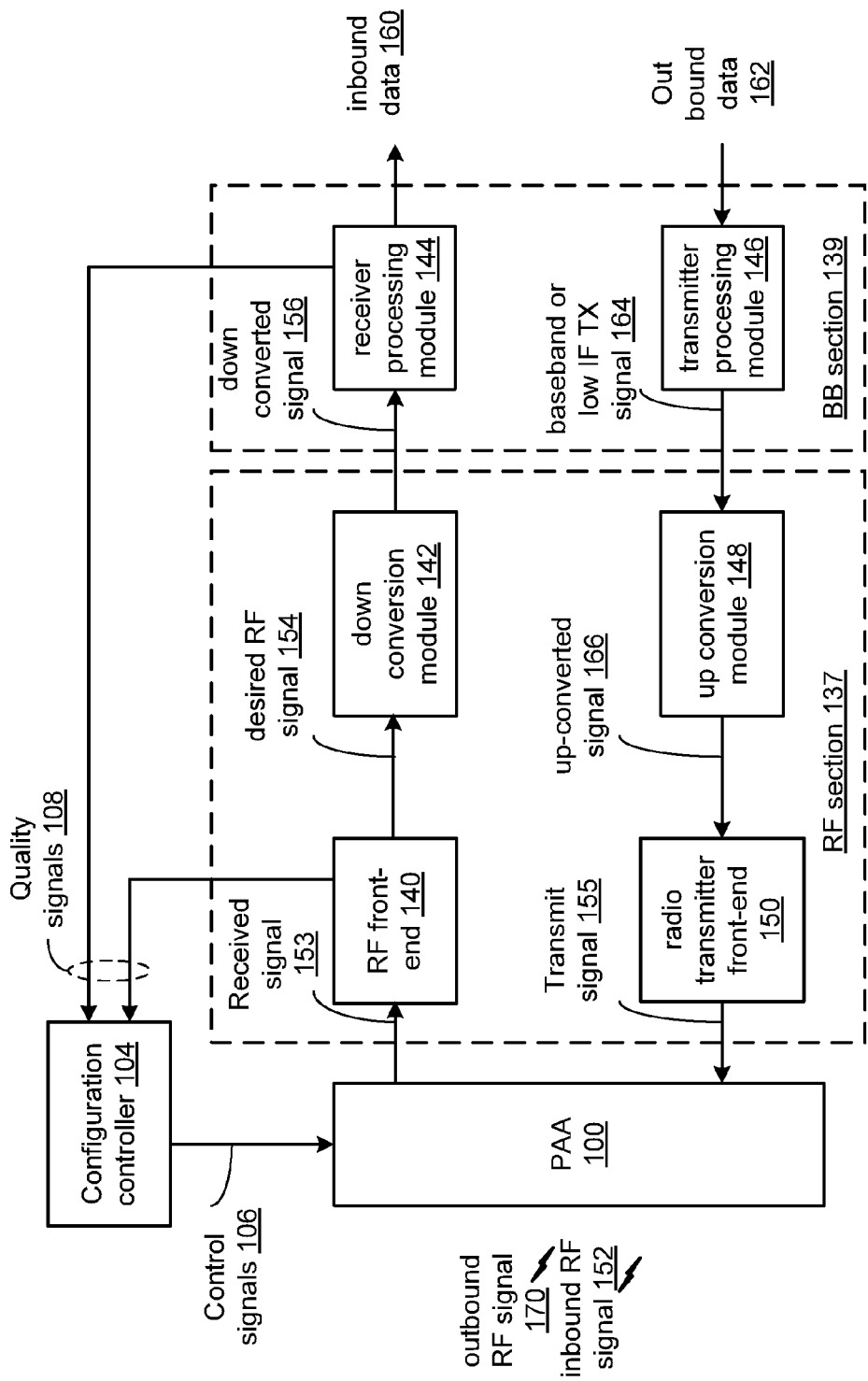
FIG. 15 is a schematic block diagram of an embodiment of RF section 137 and baseband section 139 in accordance with the present invention.

FIG. 15 is a schematic block diagram of an embodiment of RF section 137 and baseband section 139 in accordance with the present invention. In particular an RF section 137 and baseband section 139 are shown that implement an RF transceiver section such as RF transceiver section 102. The RF section 137 includes an RF front end 140, a down conversion module 142, radio transmitted front end 150 and up conversion module 148. The baseband section 139 includes a receiver processing module 144 and transmitter processing module 146.

As shown, radio transmitter front end 150 generates the transmit signal 155 to the phased array antenna 100 to produce outbound RF signal 170. RF front end 140 receives received signal 153 generated by phased array antenna 100 based on inbound RF signal 152.

In operation, the transmitter processing module 146 processes the outbound data 162 in accordance with a particular wireless communication standard (e.g., WiHD, NGMS, IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation.

The radio transmitter front end 150 includes a power amplifier and may also include a transmit filter module. The power amplifier amplifies the up converted signals 166 to produce outbound RF signals 170, which may be filtered by the transmitter filter module, if included.

The receiver front-end 140 includes a low noise amplifier with optional filtration that produces a desired RF signal 154 in response to received signal 153. The RF front end 140 further includes a signal level detector or other circuit that generates a quality signal 108 that indicates a received signal strength, signal to noise ratio, signal to noise and interference ratio or other receiver quality indication.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication protocol (e.g., WiHD, NGMS, IEEE 802.11, Bluetooth, RFID, GSM, CDMA, et cetera) to produce inbound data 160. The processing performed by the receiver processing module 144 can include, but is not limited to, digital intermediate frequency to baseband conversion, demodulation, demapping, depuncturing, decoding, and/or descrambling. Receiver processing module 144 further generates quality signal 108 based on a bit error rate, a packet error rate, a retransmission rate or other receiver quality indication that is based on either the reception of data from a remote station or that is analyzed by a remote transceiver and included in data received from that remote station. In one example, the receiver processing module 144 can generate quality data based on its own observations of bit error rate, a packet error rate, a retransmission rate, etc. In a further example, the receiver processing module 144 can receive control data from a remote transceiver that includes that remote transceivers observations of bit error rate, a packet error rate, a retransmission rate, signal strength, signal to noise ratio, signal to noise and interference ratio, or other quality metrics.

Note that the receiver processing module 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 16:
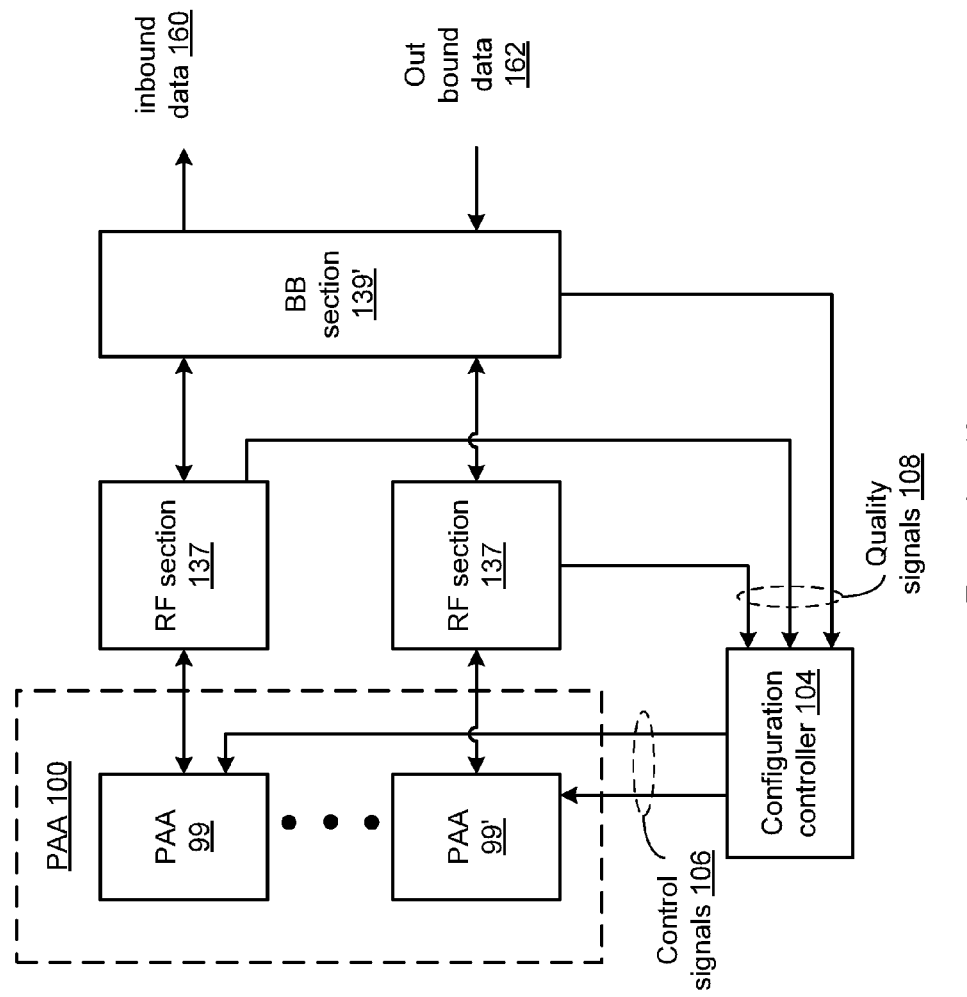
FIG. 16 is a schematic block diagram of an embodiment of a wireless transceiver in accordance with the present invention.

FIG. 16 is a schematic block diagram of an embodiment of a wireless transceiver in accordance with the present invention. In particular, another embodiment of a wireless transceiver, such as wireless transceiver 125 is presented where phased array antenna 100 includes two or more separate phase array antennas 99 and 99'. In this fashion, the wireless transceiver 125 can hop between antenna configurations from two or more different arrays. The RF transceiver section includes a plurality of RF sections 137 and a common baseband section 139' that processes inbound data 160 and outbound data 162 for communication with via phased array antenna 99, or 99' . . . .

In one example, hops in the hop sequence can alternate between the plurality of antenna arrays 99, 99', . . . . Alternatively, radiation patterns in the hop sequence can be chosen pseudorandomly to among the superset of all selected radiation patterns from each of the phased array antennas 99, 99', . . . . In an embodiment of the present invention, the phased array antennas 99 and 99' are configured to be spatially diverse from one another, such as be spaced apart, located on different sides or surfaces of a host device 101, etc. In this fashion, the spatial hopping implemented by wireless transceiver 125 can be even more robust.

Figure 17:
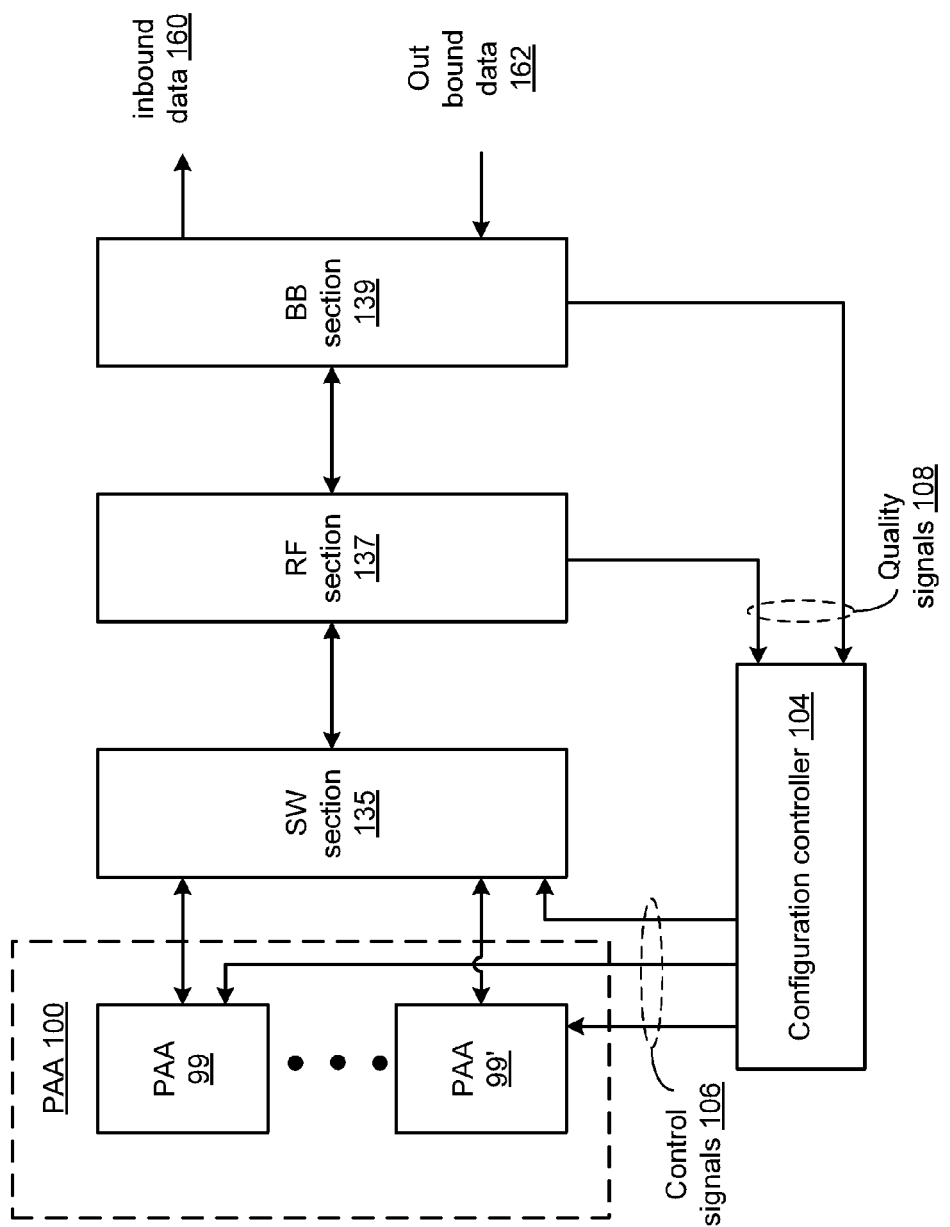
FIG. 17 is a schematic block diagram of another embodiment of a wireless transceiver in accordance with the present invention.

FIG. 17 is a schematic block diagram of another embodiment of a wireless transceiver in accordance with the present invention. Another embodiment of wireless transceiver 125 is shown where phased array antenna 100 includes two separate phase array antennas 99 and 99'. In particular, this embodiment functions in a similar fashion to the embodiment of FIG. 16, however, a single RF section 137 is alternatively coupled, via switching section 135 to a selected one of the phased array antennas 99, 99' . . . , based on which phased array antenna is in use. Configuration controller 104 generates an additional control signal 106 that commands the switching section 135 to couple the RF section 137 to the appropriate phased array antenna 99, 99', . . . , during the pairing procedure, and as antenna arrays are changed in the hopping sequence.

FIG. 18 is a flowchart representation of an embodiment of a method in accordance with the present invention. In particular, a method is presented for use in conjunction with one or more of the functions and features presented in conjunction with FIGS. 1-17. In step 400, an outbound RF signal containing outbound data is transmitted to at least one remote transceiver via at least one phased array antenna. In step 402, an inbound RF signal containing inbound data is received from the at least one remote RF transceiver, via the at least one phased array antenna. In step 404, the phased array antenna is configured to hop among a plurality of radiation patterns based on a hopping sequence. In step 406, the outbound RF signal is generated based on the outbound data. In step 408, the inbound data is generated based on the inbound RF signal.

In an embodiment of the present invention, the hopping sequence is based on a pseudorandom sequence. The at least one phased array antenna can includes a plurality of individual antenna arrays that are spatially diverse and the plurality of radiation patterns can include radiation patterns from each of the plurality of individual antenna arrays. The outbound RF signal and the inbound RF signal can be within a millimeter wave frequency band. The outbound data and the inbound data can be formatted in accordance with at least one of: a wireless high definition communication standard; and a next generation millimeter wave communication standard.

FIG. 19 is a flowchart representation of an embodiment of a method in accordance with the present invention. In particular, a method is presented for use in conjunction with one or more of the functions and features presented in conjunction with FIGS. 1-18. In step 410, quality data is generated corresponding to each of the plurality of radiation patterns. In step 412, the plurality of radiation patterns are updated based on the quality data.

In an embodiment of the present invention, the quality data can be generated based on at least one of: a signal strength, a signal to noise ratio, a signal to noise and interference ratio, a bit error rate, a packet error rate and a retransmission rate. The quality data corresponding to each of the plurality of radiation patterns is generated based on an aggregation of multiple hops for each of the plurality of radiation patterns. Step 412 can include removing one of the plurality of the radiation patterns when the quality data compares unfavorably to a quality threshold.

FIG. 20 is a flowchart representation of an embodiment of a method in accordance with the present invention. In particular, a method is presented for use in conjunction with one or more of the functions and features presented in conjunction with FIGS. 1-19. In step 420, the hopping sequence is generated by interspersing a plurality of individual hopping sequences, each of the plurality of individual hopping sequences corresponding to one of a plurality of remote transceivers.

FIG. 21 is a flowchart representation of an embodiment of a method in accordance with the present invention. In particular, a method is presented for use in conjunction with one or more of the functions and features presented in conjunction with FIGS. 1-20. In step 430, an outbound RF signal containing outbound data is transmitted to a remote transceiver via at least one phased array antenna. In step 432, an inbound RF signal containing inbound data is received from the remote RF transceiver, via the at least one phased array antenna. In step 434, a plurality of selected radiation patterns are collaboratively selected between the wireless transceiver and the remote transceiver in accordance with a pairing procedure. In step 436, the phased array antenna is configured to hop among the plurality of selected radiation patterns based on a hopping sequence. In step 438, the outbound RF signal is generated based on the outbound data. In step 440, the inbound data is generated based on the inbound RF signal.

In an embodiment of the present invention, the pairing procedure includes: generating quality data corresponding to each of a plurality of candidate radiation patterns during a wireless transceiver configuration period; and selecting the plurality of selected radiation patterns from the plurality of candidate radiation patterns, based on the quality data. Step 434 can include selecting one of the plurality of candidate radiation patterns as a corresponding one of the plurality of selected radiation patterns when the quality data compares favorably to a quality threshold. Generating the quality data can include generating the quality data based on at least one of: a signal strength, a signal to noise ratio, a signal to noise and interference ratio, a bit error rate, a packet error rate and a retransmission rate. Generating the quality data can include generating the quality data based on the inbound RF signal and wherein the inbound RF signal is transmitted omnidirectionally by the remote transceiver during a portion of the pairing procedure.

The pairing procedure can include cycling through each of the plurality of selected radiation patterns during a reciprocal radiation pattern selection by the remote transceiver. The pairing procedure can include configuring the phased array antenna to an omnidirectional radiation pattern during a portion of the pairing procedure. The at least one phased array antenna can include a plurality of individual antenna arrays that are spatially diverse and the plurality of radiation patterns can include radiation patterns from each of the plurality of individual antenna arrays. The outbound RF signal and the inbound RF signal can be within a millimeter wave frequency band. The outbound data and the inbound data can be formatted in accordance with at least one of: a wireless high definition communication standard; and a next generation millimeter wave communication standard.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention has been described in conjunction with various illustrative embodiments that include many optional functions and features. It will be apparent to those skilled in the art that the disclosed invention may be modified in numerous ways, the functions and features of these embodiments can be combined in other embodiments not expressly shown, and may assume many embodiments other than the preferred forms specifically set out and described above. Accordingly, it is intended by the appended claims to cover all modifications of the invention which fall within the true spirit and scope of the invention.

What is claimed is:

1. A wireless transceiver comprising:
   a plurality of antennas, that transmit an outbound RF signal containing outbound data to at least one remote transceiver and that receive an inbound RF signal containing inbound data from the at least one remote transceiver;
   an antenna configuration controller, coupled to the plurality of antennas, that generates a control signal to configure the plurality of antennas to hop among a plurality of radiation patterns based on a hopping sequence;
   an RF transceiver section, coupled to the plurality of antennas, that generates the outbound RF signal based on the outbound data and that generates the inbound data based on the inbound RF signal; and
   a switching section, coupled to the plurality of antennas, wherein the switching section selectively couples a selected antenna of the plurality of antennas to the RF transceiver section, based on the control signal.

2. The wireless transceiver of claim 1 wherein the antenna configuration controller receives feedback data corresponding to each of the plurality of radiation patterns and updates the plurality of radiation patterns based on the feedback data.

3. The wireless transceiver of claim 2 wherein the antenna configuration controller updates the plurality of radiation patterns by removing one of the plurality of the radiation patterns when the feedback data corresponding to the one of the plurality of radiation patterns compares unfavorably to a feedback threshold.

4. The wireless transceiver of claim 2 wherein the feedback data is based on at least one of: a signal strength, a signal to noise ratio, a signal to noise and interference ratio, a bit error rate, a packet error rate and a retransmission rate.

5. The wireless transceiver of claim 2 wherein the feedback data corresponding to each of the plurality of radiation patterns is based on an aggregation of multiple hops for each of the plurality of radiation patterns.

6. The wireless transceiver of claim 1 wherein the hopping sequence is based on a pseudorandom sequence.

7. The wireless transceiver of claim 1 wherein the at least one remote transceiver includes a plurality of remote transceivers and the hopping sequence includes a plurality of individual hopping sequences each corresponding to one of the plurality of remote transceivers.

8. The wireless transceiver of claim 1 wherein the plurality of antennas include at least two antenna arrays.

9. The wireless transceiver of claim 1 wherein the outbound RF signal and the inbound RF signal are within a millimeter wave frequency band.

10. The wireless transceiver of claim 1 wherein the outbound data and the inbound data are formatted in accordance with at least one of: a wireless high definition communication standard; and a next generation millimeter wave communication standard.

11. A wireless transceiver comprising:
   a plurality of antennas, that transmit an outbound RF signal containing outbound data to at least one remote transceiver and that receive an inbound RF signal containing inbound data from the at least one remote transceiver, wherein the plurality of antennas is configurable based on a control signal;
   an antenna configuration controller, coupled to the plurality of antennas, that generates the control signal to configure the plurality of antennas to hop among a plurality of radiation patterns based on a hopping sequence; and
   a switching section, coupled to the plurality of antennas; and
   an RF transceiver section, coupled to the switching section, that generates the outbound RF signal based on the outbound data and that generates the inbound data based on the inbound RF signal;
   wherein the switching section selectively couples a selected antenna of the plurality of antennas to the RF transceiver section, based on the control signal.

12. The wireless transceiver of claim 11 wherein the antenna configuration controller receives feedback data corresponding to each of the plurality of radiation patterns and updates the plurality of radiation patterns based on the feedback data.

13. The wireless transceiver of claim 12 wherein the antenna configuration controller updates the plurality of radiation patterns by removing one of the plurality of the radiation patterns when the feedback data corresponding to the one of the plurality of radiation patterns compares unfavorably to a feedback threshold.

14. The wireless transceiver of claim 12 wherein the feedback data is based on at least one of: a signal strength, a signal to noise ratio, a signal to noise and interference ratio, a bit error rate, a packet error rate and a retransmission rate.

15. The wireless transceiver of claim 11 wherein the antenna configuration controller generates feedback data corresponding to each of the plurality of radiation patterns based on an aggregation of multiple hops for each of the plurality of radiation patterns.

16. The wireless transceiver of claim 11 wherein the hopping sequence is based on a pseudorandom sequence.

17. The wireless transceiver of claim 11 wherein the at least one remote transceiver includes a plurality of remote transceivers and the hopping sequence includes a plurality of individual hopping sequences each corresponding to one of the plurality of remote transceivers.

18. The wireless transceiver of claim 11 wherein the plurality of antennas include at least two antenna arrays.

19. The wireless transceiver of claim 11 wherein the outbound RF signal and the inbound RF signal are within a millimeter wave frequency band.

20. A wireless transceiver comprising:
an antenna configuration controller, coupled to a plurality of antennas, that generates a control signal to configure the plurality of antennas to hop among a plurality of radiation patterns based on a hopping sequence;
an RF transceiver section, coupled to the plurality of antennas, that generates an outbound RF signal based on outbound data and that generates inbound data based on an inbound RF signal; and
a switching section, coupled to the plurality of antennas and the antenna configuration controller, wherein the switching section selectively couples a selected antenna of the plurality of antennas to the RF transceiver section, based on the control signal.

* * * * *